United States Patent Office 3,850,912
Patented Nov. 26, 1974

3,850,912
N¹-(1,2-DIHYDRO-2-OXO-4-PYRIMIDINYL)-
SULFANILAMIDES
Hermann Bretschneider, Innsbruck, Hans Fliri, Lochau,
and Wilhelm Klotzer, Innsbruck, Austria, assignors to
Hoffmann-La Roche Inc., Nutley, N.J.
No Drawing. Filed Oct. 10, 1973, Ser. No. 404,956
Claims priority, application Switzerland, Oct. 20, 1972,
15,417/72
Int. Cl. A61k 27/00; C07d 5/34
U.S. Cl. 260—239.75       7 Claims

ABSTRACT OF THE DISCLOSURE

N¹-(1-lower alkoxy, allyloxy or lower alkoxy-lower alkoxy - 1,2-dihydro-2-oxo-4-pyrimidinyl)-sulfanilamides, useful as antibacterial agents, are described.

BRIEF SUMMARY OF THE INVENTION

The invention relates to compounds characterized by the formula

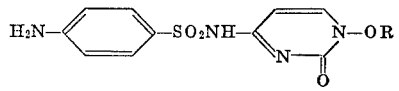

wherein R is lower alkyl, allyl or lower alkoxy-lower alkyl and to pharmaceutically acceptable alkali metal salts and salts with strong organic bases thereof.

DETAILED DESCRIPTION OF THE INVENTION

The sulfanilamides of the invention characterized by the formula

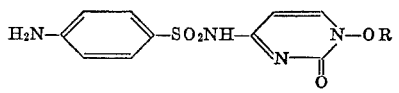

wherein R is lower alkyl, allyl or lower alkoxy-lower alkyl,
can be prepared by:

(a) reacting a compound of the formula

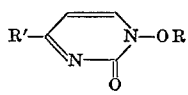

wherein R is as previously described and R' is a leaving atom or group,
with an alkali metal salt of sulfanilamide;

(b) saponifying the acylamino group of a compound of the formula

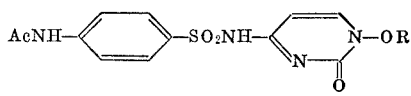

wherein R is as previously described and Ac is acyl; or (c) reducing the nitro group of a compound of the formula

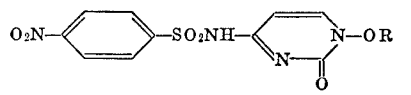

wherein R is as previously described,
to amino.

Pharmaceutically acceptable alkali metal salts and salts with strong organic bases of compounds of the formula I can be prepared in the usual way by reaction with the corresponding base. Examples of such bases are sodium or potassium hydroxide and ethanolamine or diethanolamine.

As used herein, the term "lower alkyl" preferably is an alkyl group containing from 1 to 6 carbon atoms. Examples of lower alkyl groups denoted by R are methyl, ethyl, propyl, butyl, or the like. The term "lower alkoxy" denotes an alkyl ether group in which the lower alkyl group is as described above, for example, methoxy, ethoxy, propoxy, butoxy or the like. Examples of lower alkoxy-lower alkyl groups are methoxyethyl, ethoxyethyl, or the like. Examples of leaving atoms and groups denoted by R' in the compounds of formula II are quaternary ammonium groups, for example, trimethylammonium or the like, lower alkylthio, for example, methylthio or the like, lower alkoxy, for example, methoxy or the like, lower alkylsulfonyl, for example, mesyl or the like, arylsulfonyl, for example, benzenesulfonyl, tosyl or naphthylsulfonyl, arylsulfonyloxy, for example, benzenesulfonyloxy, tosyloxy or naphthylsulfonyloxy or the like, phenoxy, p-chlorophenoxy or halogen, for example, chlorine, bromine, fluorine or iodine; especially preferred is chlorine. The term "aryl" preferably denotes naphthyl, phenyl or phenyl bearing one or more substituents selected from the group consisting of halogen, trifluoromethyl, lower alkyl, lower alkoxy, nitro or amino. The term "acyl" denotes an "alkanoyl" group derived from an aliphatic carboxylic acid of 1–7 carbon atoms, for example, formyl, acetyl, propionyl and the like; and an "aroyl" group derived from an aromatic carboxylic acid such as benzoyl, phenacetyl, phthaloyl and the like.

The reaction fo a compound of formula II with an alkali metal salt of sulfanilamide, for example, sodium sulfanilamide, in accordance with process embodiment (a) can be carried out in a manner known per se. Conveniently, an excess, for example, a two-fold or three-fold amount of the sulfanilamide, is utilized in the reaction. The reaction of a compound of formula II with the alkali metal salt of sulfanilamide can be carried out by heating the dry reaction mixture, but it can also be carried out in a solvent. Suitable solvents for the reaction of a compound of formula II wherein R' is quaternary ammonium are, for example, acetamide or the like. The reaction of a compound of formula II wherein R' is lower alkylthio or lower alkoxy is suitably carried out in an alkanol such as methanol or the like.

The saponification of the acylamino group in a compound of formula III in accordance with process embodiment (b) can be carried out by warming a compound of formula III with a base in aqueous solution, for example, in dilute sodium hydroxide or the like.

The saponification of the acylamino group in a compound of formula III (i.e. the cleavage of the acyl moiety with the formation of an amino group) can also be carried out in an acidic medium; for example, by acid-catalysed alcoholysis, advantageously with HCl/methanol.

The reduction of the nitro group in a compound of the formula IV, in accordance with process embodiment (c) can be carried out, for example, by catalytic hydrogenation.

The starting materials of formula II can be prepared by reacting urea which bears an RO-group, wherein R is as previously described, with a β,β-diethoxypropionic acid ester to give a 1-RO-uracil and introducing the leaving atom or group into the 4-position of the obtained uracil derivative. The introduction of a chlorine atom can be carried out, for example, by treating the uracil derivative with thionyl chloride or POCl₃. The resulting 1-RO-4-chlorouracil can be converted into a compound of formula II where R' is a quaternary ammonium group by reacting with a trialkylamine. For the preparation of compounds of formula II wherein R' is lower alkoxy, a corresponding 4-chlorouracil can be treated with sodium and the alkanol corresponding to the alkoxy group to be introduced. Compounds of formula II wherein R' is lower alkylthio can be prepared from a corresponding 4-thiouracil by alkylation; for example, by treatment with an alkyl halide, for example, methyl iodide in the presence of an alkali metal alkylate, for example, sodium methylate in absolute methanol. The 4-thiouracils can be obtained from the corresponding uracil by treatment with phosphorus pentasulfide in pyridine.

The compounds of formulas III and IV can be prepared in a manner analogous to process embodiment (a) using a p-(acylamino or nitro)-benzenesulfonamide in place of sulfanilamide.

The compounds of formulae III and IV can, however, also be prepared by reacting, in a manner known per se, an activated sulphonic acid component (e.g. an azolide), especially an imidazolide of the general formula

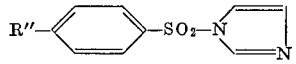

(V)

wherein R'' represents a nitro or acylamino group, with a cytosine derivative of the general formula

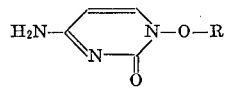

(VI)

wherein R has the significance given earlier.

The imidazolides of formula IV can be obtained, for example, by reacting a corresponding free sulphonic acid with N,N'-carbonyl-diimidazole.

The sulfanilamides of formula I are useful as chemotherapeutic agents. More particularly, they can be used for the control of bacterial infections. In vitro, the sulfanilamides of formula I wherein R is ethyl, propyl or butyl, have shown bacteriostatic activity in concentrations of 1 to 10 γ/ml. against for example *Staphylococcus aureus* and *Escherichia coli*. In the case of systemic infections with *Streptococcus haemolyticus* in mice, a $CD_{50}$ of about 20 mg./kg. was established on peroral administration of the aforementioned sulfanilamides. The compounds of formula I have demonstrated an $LD_{50}$ of up to 5 g./kg. on peroral administrations to mice. Thus, the compounds of formula I are useful as antibacterial agents.

The sulfanilamides of formula I can be used as medicaments, for example, in the form of pharmaceutical preparations which contain them in association with a compatible pharmaceutical carrier. Such a carrier may be an organic or inorganic inert carrier material suitable for enteral, percutaneous or parenteral administration such as, for example, water, gelatin, gum arabic, lactose, starch, magnesium stearate, talc, vegetable oils, polyalkylene glycols or the like. The pharmaceutical preparations can be made up in solid form, for example, as tablets, dragees, suppositories or capsules, in semi-solid form, for example, as ointments, or in liquid form, for example, as solutions, suspensions or emulsions. They may be sterilized and/or may contain adjuvants such as preservatives, stabilizers, wetting agents, emulsifiers, salts for varying the osmotic pressure or buffers. They can also contain other therapeutically active substances.

Exemplary of the compounds of formula I are:

$N^1$-(1-allyloxy-1,2-dihydro-2-oxo-4-pyrimidinyl)-sulfanilamide;
$N^1$-(1-methoxymethoxy-1,2-dihydro-2-oxo-4-pyrimidinyl)-sulfanilamide;
$N^1$-(1-ethoxyethoxy-1,2-dihydro-2-oxo-4-pyrimidinyl)-sulfanilamide;
$N^1$-(1-ethoxypropoxy-1,2-dihydro-2-oxo-4-pyrimidinyl)-sulfanilamide;
$N^1$-(1-propoxybutoxy-1,2-dihydro-2-oxo-4-pyrimidinyl)-sulfanilamide;

or the like.

The following Examples further illustrate the invention. All temperatures are in degrees Centigrade, unless otherwise mentioned.

EXAMPLE 1

Preparation of $N^1$-(1-propoxy-1,2-dihydro-2-oxo-4-pyrimidinyl)-sulfanilamide 25 g. of sodium sulfanilamide and 25 g. of azetamide are triturated to a homogeneous powder and then heated to 140–150°, whereby a clear, light to draw brown solution results. After cooling the solution to 90°, 7.6 g. of 1 - propoxy - 4 - dimethylamino - 2 - pyrimidone-methochloride are added in small portions. The resulting reaction mixture is left for an additional 10 minutes on a boiling water bath, taken up in 100 ml. of water and carbon dioxide led in with ice-cooling. When a pH of 8–9 is reached, the mixture is filtered to remove the precipitate and carbon dioxide led again into the mother liquor with cooling. The resulting solution is mixed with carbon and stirred for several hours. Thereafter, the mixture is filtered and adjusted to a pH 4 by the addition of concentrated hydrochloric acid. The initially oily precipitated product crystallizes after brief warming to 50–60° and subsequent cooling. For purification, the product is dissolved several times in sodium bicarbonate solution, the solution purified with active carbon and finally acidified. Finally, the product is recrystallized from ethanol/water, whereby there is obtained $N^1$-(1-propoxy - 1,2 - dihydro-2-oxo - 4 - pyrimidinyl)-sulfanilamide, having a melting point of 144–146°.

The pyrimidine derivative used as the starting material can be prepared as follows:

To a solution of 1.3 g. of sodium in 75 ml. of absolute ethanol, there are added at room temperature 6 g. of N-propoxyurea and 10.5 g. of β,β-diethoxypropionic acid ethyl ester. The solution is allowed to stand for 3 hours at 20–25° and then boiled under reflux for 15 hours, whereupon the solvent is evaporated and the residue is taken up in 30 ml. of water and carefully acidified to pH 3 with hydrochloric acid with ice-cooling. The precipitate is recrystallized from methanol and yields 1-propoxyuracil having a melting point of 112–113°.

8.5 g. of 1-propoxyuracil are boiled overnight with 100 ml. of thionyl chloride and 5 drops of dimethylformamide. Thereafter, the thionyl chloride is removed by distillation, the oily residue is mixed twice with 30 ml. of absolute benzene each time and brought to dryness. The obtained chloropyrimidine is taken up in 100 ml. of absolute benzene. The resulting solution is filtered and mixed with an excess of a solution of trimethylamine in benzene, whereby the quaternary salt precipitates. After standing for 2 hours at room temperature, the solution is mixed with 100 ml. of absolute ether and left to stand for an additional 2 hours. The resulting quaternary salt is removed by filtration and dried in a vacuum desiccator. The obtained 1-propoxy-4-dimethylamino-2-pyrimidone-methochloride is used for the further reaction.

EXAMPLE 2

Preparation of $N^1$-(1-butoxy-1,2-dihydro-2-oxo-4-pyrimidinyl)-sulfanilamide

In a manner analogous to that described in Example 1, there is obtained from 1-butoxy-4-dimethylamino-2(1H)-pyrimidone-methochloride and sodium sulfanilamide, $N^1$-(1-butoxy-1,2-dihydro - 2 - oxo-4-pyrimidinyl)-sulfanilamide having a melting point of 164° (from ethanol/water).

The starting material can be prepared by reacting N-butoxyurea with β,β-diethoxypropionic acid ester to give 1-butoxyuracil and reacting the latter with thionyl chloride and trimethylamine as described above, to give 1-butoxy-4-dimethylamino-2-pyrimidone-methochloride.

EXAMPLE 3

Preparation of $N^1$-(1-ethoxy-1,2-dihydro-2-oxo-4-pyrimidinyl)-sulfanilamide

In a manner analogous to that described in Example 1, there is obtained from 1-ethoxy-4-dimethylamino-2-(1H)-pyrimidone-methochloride and sodium sulfanilamide, $N^1$-(1-ethoxy-1,2-dihydro - 2 - oxo-4-pyrimidinyl)-sulfanilamide, which is purified by reprecipitation from sodium bicarbonate solution and hydrochloric acid and melts at 105°. A water determination according to Karl Fischer yielded 0.82% water in the analysis preparation.

EXAMPLE 4

Preparation of $N^1$-(1-propoxy-1,2-dihydro-2-oxo-4-pyrimidinyl)-sulfanilamide 3 g. of $N^1$-(1-propoxy-1,2-dihydro-2-oxo-4-pyrimidinyl)-$N^2$-acetylsulfanilamide are dissolved in 20 ml. of 2N sodium hydroxide and allowed to stand for 1 hour at 90°. After cooling, the solution is adjusted to pH 4 with concentrated hydrochloric acid, whereby $N^1$-(1-propoxy-1,2-dihydro-2-oxo-4-pyrimidinyl) - sulfanilamide precipitates, which is identical to the compound prepared according to Example 1.

The starting material can be prepared as follows:

3.7 g. of 1-propoxy-cytosine are suspended at 0° in 20 ml. of absolute pyridine. The resulting suspension is mixed, with stirring, with 5.15 g. of p-acetamidobenzenesulfochloride and allowed to stand for 20 hours at 0°. Thereafter, the pyridine is removed under reduced pressure. The oily residue is taken up in 20 ml. of saturated sodium bicarbonate solution, decolorized with activated carbon and the solution acidified with concentrated hydrochloric acid, whereby there is obtained 4 g. of $N^1$-(1-propoxy-1,2-dihydro-2-oxo - 4 - pyrimidinyl)-$N^2$-acetylsulfanilamide having a melting point of 131–133°.

EXAMPLE 5

Preparation of $N^1$-(1-butoxy-1,2-dihydro-2-oxo-4-pyrimidinyl)-sulfanilamide

In a manner analogous to that described in Example 4, there is obtained from $N^1$-(1-butoxy-1,2-dihydro-2-oxo-4-pyrimidinyl)-$N^2$-acetylsulfanilamide, $N^1$-(1-butoxy-1,2-dihydro-2-oxo-4-pyrimidinyl)-sulfanilamide which is identical with the compound prepared according to Example 2.

The starting material can be prepared from 1-butoxy-cytosine and p-acetaminobenzenesulfochloride and has a melting point of 115–118°.

EXAMPLE 6

Preparation of $N^1$-(1-methoxy-1,2-dihydro-2-oxo-4-pyrimidinyl)-sulfanilamide 1 g. of 1-methoxy-4-(p-nitrobenzenesulfonamido)-2-pyrimidone is dissolved in 100 ml. of glacial acetic acid with warming and after cooling, added to 100 mg. of palladium-carbon (10%) which has been previously dehydrated in 10 ml. of glacial acetic acid. After the uptake of the calculated amount of hydrogen (after about 10 minutes), the hydrogenation is stopped. The catalyst is removed by filtration and the solution evaporated under reduced pressure, whereby there is obtained 0.9 g. of $N^1$-(1-methoxy-1,2-dihydro - 2 - oxo - 4 - pyrimidinyl)-sulfanilamide as a colorless oil.

The starting material can be prepared as follows:

7.1 g. of 1-methoxyuracil are converted into 1-methoxy-4-dimethylamino - 2(1H) - pyrimidone-methochloride in analogy to the last part of Example 1. The methochloride is added at 90° portionwise to a solution of 30 g. of sodium 4-nitrobenzenesulfonamide in 30 g. of acetamide. The reaction mixture is maintained at 90° for an additional 10 minutes, allowed to cool and taken up in 100 ml. of water. Thereafter, carbon dioxide is led into the solution with ice-cooling until a pH 8 is reached. The resulting precipitate is removed by filtration and the solution acidifies with concentrated hydrochloric acid, whereby there is obtained 1-methoxy-4-(p-nitrobenzenesulfonamido)-2(1H)-pyrimidone having a melting point of 204–206°.

EXAMPLE 7

(a) Preparation of the starting material 1-ethoxy-4-methylthio-pyrimidin-2-one 6.2 g. of 1-ethoxy-4-thiouracil are introduced into a solution of 900 mg. of sodium in 100 ml. of absolute methanol. To the resulting solution, 5.2 g. of methyl iodide are added dropwise with stirring and ice-cooling. Subsequently, the reaction solution is left to stand at 20° for 2 hours.

(b) Preparation of $N^1$-(1-ethoxy-1,2-dihydro-2-oxo-4-pyrimidinyl)-sulfanilamide 12 g. of sulfanilamide are introduced into a solution of 1.7 g. of sodium in 200 ml. of absolute methanol and mixed with the solution of 1-ethoxy-4-methylthio-2(1H)-pyrimidone obtained according to part (a) and boiled for 30 hours. Subsequently, the reaction mixture is concentrated to dryness under reduced pressure, taken up in 100 ml. of water and adjusted to a pH 8 using carbon dioxide with ice-cooling. The precipitated sulfanilamide is removed by filtration and the filtrate adjusted to a pH 4 with concentrated hydrochloric acid. In so doing, $N^1$-(1-ethoxy-1,2-dihydro - 2 - oxo-4-pyrimidinyl)-sulfanilamide precipitated as a brown mass which can be filtered after prolonged standing.

For the purification, the product is dissolved in sodium bicarbonate solution. The resulting solution is treated with carbon, filtered and acidified with hydrochloric acid. The obtained product is identical with the compound obtained according to Example 3.

EXAMPLE 8

Preparation of $N^1$-(1-butoxy-1,2-dihydro-2-oxo-4-pyrimidinyl)-sulfanilamide

In a manner analogous to that described in Example 7, there is obtained from 1-n-butoxy-4-methylthio-2(1H)-pyrimidone and sodium sulfanilamide in methanol, $N^1$-(1-butoxy - 1,3-dihydro-2-oxo-4-pyrimidinyl) - sulfanilamide which is identical with the compound prepared according to Example 2.

The 1-n-butoxy - 4 - methylthio-2(1H)-pyrimidone can be prepared as follows:

2 g. of 1-butoxy-4-thiouracil are dissolved in 30 ml. of absolute methanol and added to a solution of 230 mg. of sodium in 30 ml. of absolute methanol. To this solution there are added dropwise at 0° with stirring 1.42 g. of methyl iodide and the mixture is stirred for 2 hours at 20°. For the working up, the reaction mixture is evaporated under reduced pressure, taken up in 10 ml. of 5% ice-cold sodium hydroxide and 20 ml. of chloroform and the aqueous layer extracted twice more with 20 ml. of chloroform each time. The combined organic layers are washed with water, dried and evaporated, whereby there is obtained 1-n-butoxy-4-methylthio-2(1H)-pyrimidone as a colorless oil which, with trituration with cyclohexane/petroleum ether (1:1), crystallized in the form of white platelets having a melting point of 44–45°.

EXAMPLE 9

Preparation of $N^1$-(1-propoxy-1,2-dihydro-2-oxo-4-pyrimidinyl)-sulfanilamide

In a manner analogous to that described in Example 4, there is obtained from $N^1$-(1-methoxy-1,2-dihydro-3-oxo-4-pyrimidinyl)-$N^2$-acetylsulfanilamide, $N^1$-(1 - propoxy-1,2-dihydro-2-oxo-4 - pyrimidinyl) - sulfanilamide whose physical data correspond with the compound obtained according to Example 6.

The starting material can be prepared as follows:

6 g. of 1-methoxy-4-thiouracil are introduced into a solution of 0.9 g. of sodium in 200 ml. of absolute methanol and subsequently 4.7 g. of methyl iodide added dropwise with stirring at 0°. The reaction mixture is stirred at room temperature and, after 2 hours, mixed with 25.4 g. of sodium $N^4$-acetyl-sulfanilamide. The reaction mixture is heated to reflux for 15 hours, cooled and concentrated under reduced pressure. The residue is taken up in 100 ml. of water and the solution adjusted to pH 8 using carbon dioxide with ice-cooling. The precipitate is removed by filtration. The filtrate is acidified with concentrated hydrochloric acid, whereby there is obtained $N^1$-(1-methoxy-1,2-dihydro - 2 - oxo - 4 - pyrimidinyl)-$N^2$-acetylsulfanilamide having a melting point of 181–183° (with 1.34% water).

EXAMPLE 10

3.0 g. of 1-butoxy-uracil and 35 ml. of freshly distilled thionyl chloride are boiled at reflux for 17 hours with the addition of 2 drops of dimethylformamide. After removal of the excess thionyl chloride under reduced pressure, the residue is dissolved three times in 50 ml. of dry benzene and evaporated.

The resulting semi-solid mass is dissolved in 30 ml. of dimethylformamide with the exclusion of moisture and treated with 7.7 g. of sodium $N^4$-acetyl-sulphanilamide, whereby a warming-up of the mixture to 40°–45° C. occurs. In order to complete the reaction, the mixture is heated at 100° C. for 1 hour. The solvent is distilled off under reduced pressure, the residue dissolved in 50 ml. of water, the solution saturated with carbon dioxide, filtered and made acid to Congo red with hydrochloric acid. The precipitate is chromatographed over silica gel with ethyl acetate. There are thus obtained 1.8 g. of $N^1$-(1-butoxy-1,2-dihydro-2-oxo - 4 - pyrimidinyl) - $N^2$ - acetyl sulphanilamide which, after recrystallization from ethanol/water, melts at 116–118° C.

The cleavage of the $N^2$-acetyl group to form $N^1$-(1-butoxy - 1,2 - dihydro - 2-oxo-4-pyrimidinyl)-sulphanilamide can be carried out in a manner analogous to that described in Example 4.

The Example which follows illustrates pharmaceutical preparations containing a sulfanilamide of the invention.

EXAMPLE 11

Pharmaceutical preparations containing $N^1$-(1-butoxy-1,2-dihydro-2-oxo-4-pyrimidinyl) - sulfanilamide (hereinafter referred to as the Active Ingredient) are prepared:

a) Tablets of the following composition:

|  | Micrograms | |
|---|---|---|
| Active ingredient | 500 or | 250 |
| Mannitol |  | 50 |
| Milk sugar | 30 | 50 |
| Avicel | 100 | 137 |
| Tylose | 5 | 3 |
| Talc | 14 | 9 |
| Magnesium stearate | 1 | 1 |
| Total | 650 | 500 |

The Active Ingredient is mixed together with a portion of the Avicel, lactose and, if desired, maize starch. The mixture is granulated with an aqueous or aqueous/alcoholic Tylose solution, dried and, after the addition of the remaining ingredients, pressed into tablets.

b) Injectables in 5 cc. ampuls containing:

|  | Micrograms | |
|---|---|---|
| Active ingredient | 500.0 | 500.0 |
| Sodium hydroxide | 59.1 |  |
| Diethanolamine |  | 155.4 |
| Water for injection, ad 5 ml |  |  |

The ampuls are filled under an atmosphere of nitrogen and sterilized in an autoclave at 120°.

c) Capsules of the composition:

|  | Micrograms | |
|---|---|---|
| Active ingredient | 250.0 or | 500 |
| Methylcellulose | 2.5 | 5 |
| Talc | 4.0 | 8 |
| Primojel | 7.5 | 15 |
| Magnesium stearate | 1.0 | 2 |
| Total | 265.0 | 530 |

The Active Ingredient is moistened with a methyl cellulose solution and kneaded. The mass is thereafter granulated, dried and sifted. The resulting granulation is mixed together with a mixture of Primojel, talc and magnesium stearate. This mixture is filled into gelatin capsules on an automatic capsulating machine.

We claim:

1. A sulfanilamide of the formula

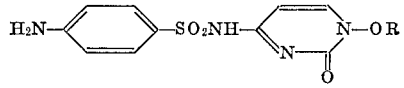

wherein R is lower alkyl, allyl or lower alkoxy-lower alkyl and pharmaceutically acceptable alkali metal salts and salts with strong organic bases thereof.

2. A compound in accordance with claim 1, $N^1$-(1-butoxy-1,2-dihydro-2-oxo-4-pyrimidinyl)-sulfanilamide.

3. A compound in accordance with claim 1, $N^1$-(1-propoxy-1,2-dihydro-2-oxo-4-pyrimidinyl)-sulfanilamide.

4. A compound in accordance with claim 1, $N^1$-(1-ethoxy-1,2-dihydro-2-oxo-4-pyrimidinyl)-sulfanilamide.

5. A compound in accordance with claim 1, $N^1$-(1-methoxy-1,2-dihydro-2-oxo-4-pyrimidinyl)-sulfanilamide.

6. A compound of the formula

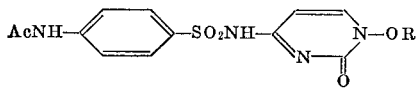

wherein Ac is alkanoyl of 1 to 7 carbon atoms, benzoyl, phenacetyl or phthaloyl and R is lower alkyl, allyl or lower alkoxy-lower alkyl.

7. A compound of the formula

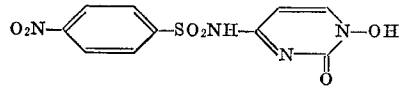

wherein R is lower alkyl, allyl or lower alkoxy-lower alkyl.

References Cited

UNITED STATES PATENTS 3,375,247   3/1968   Doub et al. _____ 260—239.75

HENRY R. JILES, Primary Examiner

C. M. S. JAISLE, Assistant Examiner

U.S. Cl. X.R.

424—229

UNITED STATES PATENT OFFICE
CERTIFICATE OF CORRECTION

Patent No. 3,850,912         Dated November 26, 1974

Inventor(s) Hermann Bretschneider, Hans Fliri and Wilhelm Klotzer

It is certified that error appears in the above-identified patent and that said Letters Patent are hereby corrected as shown below:

Column 8, Claim 7, lines 50-54

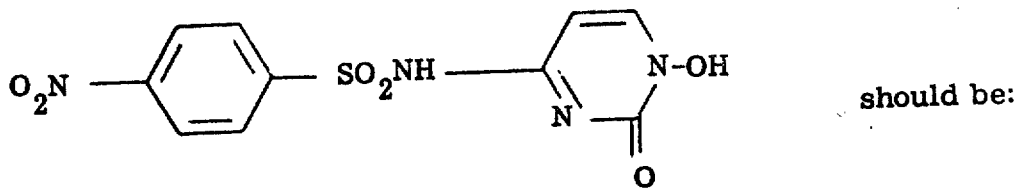     should be:

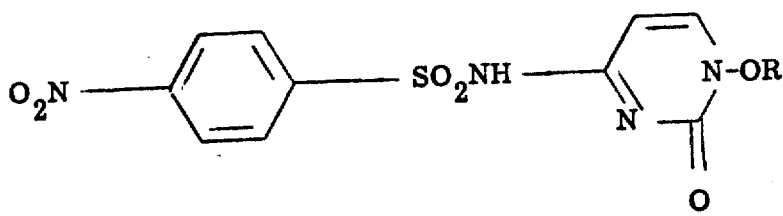

Signed and sealed this 18th day of February 1975.

(SEAL)
Attest:

RUTH C. MASON
Attesting Officer

C. MARSHALL DANN
Commissioner of Patents
and Trademarks